Sept. 1, 1964     R. A. GOULET ETAL     3,146,528
BEARING TESTER

Filed May 17, 1961     2 Sheets-Sheet 1

INVENTOR.
RALPH A. GOULET
TYRIE S. RANDOLPH
BY
ATTORNEYS 3,146,528
BEARING TESTER
Ralph A. Goulet and Tyrie S. Randolph, Indianapolis, Ind., assignors to the United States of America as represented by the Secretary of the Navy
Filed May 17, 1961, Ser. No. 110,828
13 Claims. (Cl. 33—174)
(Granted under Title 35, U.S. Code (1952), sec. 266)

The invention described herein may be manufactured and used by or for the Government of the United States of America for governmental purposes without the payment of any royalties thereon or therefor.

The present invention relates to a bearing tester and more particularly to a bearing tester for checking the radial internal clearance of a ball bearing. Radial internal clearance is the total diametrical movement between the inner and outer race of a ball bearing when one race is clamped and a specified radial load is applied to the other race in successively opposite directions.

Many highly precision mechanical assemblies and subassemblies employ ball bearings for rotatably supporting shafts, gears, clutches, and other mechanical devices. The radial internal clearance, or radial play as it is often called, effects the overall precision of an instrument as radial play creates backlash in gears, free play of parts and the like. Thus it is often necessary to test bar bearings so that those having only a permissible radial play will be used in highly precision instruments.

The present invention relates to an improved bearing tester that locks the inner race of a bearing to be tested to a spindle and then applies a radial load to the bearing's outer race through a unique pivoting system. The load first applied is then removed, and a similar load is applied in an opposite direction to the outer race. The movement of the outer race is shown by a dial indicator. The unique design of the pivoting system of the present invention permits the rapid changing of loads that are to be applied without having to recalibrate the bearing tester. The spindle can be rotated so that the internal radial clearance can be checked at a number of different positions.

It is therefore a general object of the present invention to provide an improved bearing tester for accurately and quickly testing the quality of a bearing.

Another object of the present invention is to provide an improved bearing tester for determining the radial internal clearance of a bearing.

Still another object of the present invention is to provide an improved mechanism for applying a radial load to the outer race of a ball bearing.

Other objects and advantages of the present invention will be readily appreciated as the same becomes better understood by reference to the following detailed description when considered in connection with the accompanying drawing wherein.

Figure 1:
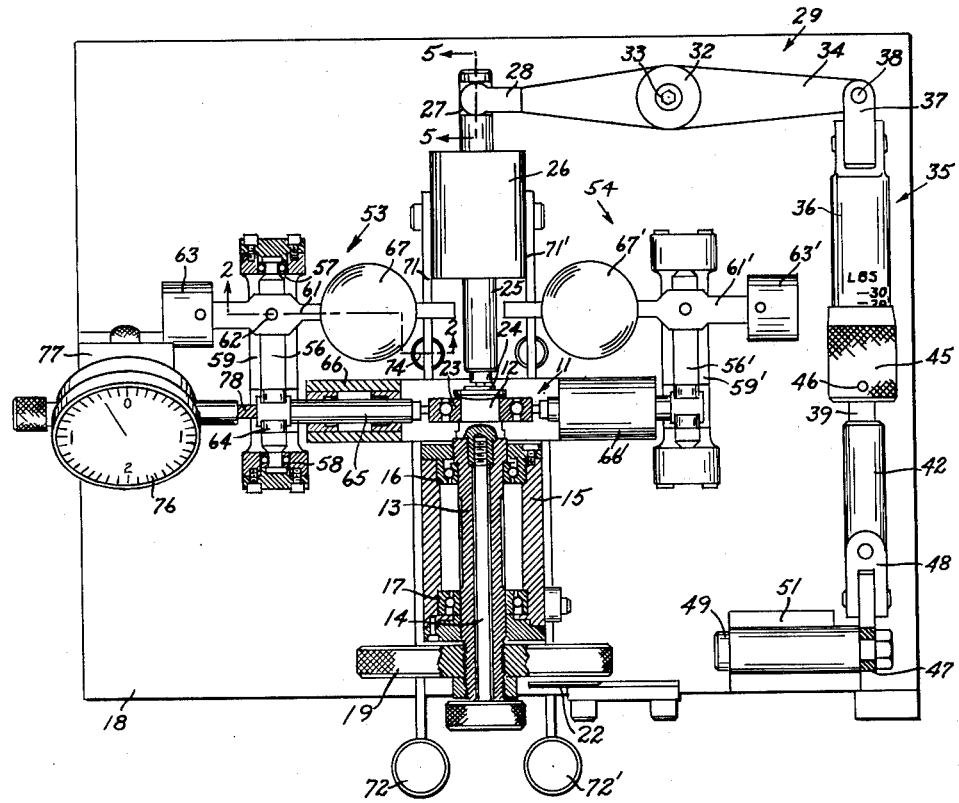
FIG. 1 is a top plan view, partially in section, of a preferred embodiment of the present invention.

Referring now to the drawings wherein like reference characters designate like or corresponding parts throughout the several views, there is shown in FIG. 1, a bearing 11 to be tested that is supported on a spindle end 12. The spindle end 12 is slip-fitted into tubular shaft 13 and secured thereto by means of screw 14 that passes through the bore of the tubular shaft 13. This arrangement permits different size spindle ends 12 to be used to accommodate various size bearings that are to be tested. Tubular shaft 13 is rotatably supported in housing 15 by means of bearings 16 and 17. Housing 15, as well as the other subassemblies hereinafter described, are mounted on a base plate 18. A finger wheel 19 is threaded onto the end of tubular shaft 13 and rotation of finger wheel 19 will rotate tubular shaft 13 and spindle end 12. Finger wheel 19 is provided with a plurality of holes 21, and a finger stop 22 is attached to base plate 18. The combination of the holes 21 and the finger stop 22 permits finger wheel 19, and consequently, tubular shaft 13 and spindle end 12, to be rotated to various angular positions.

Figure 4:
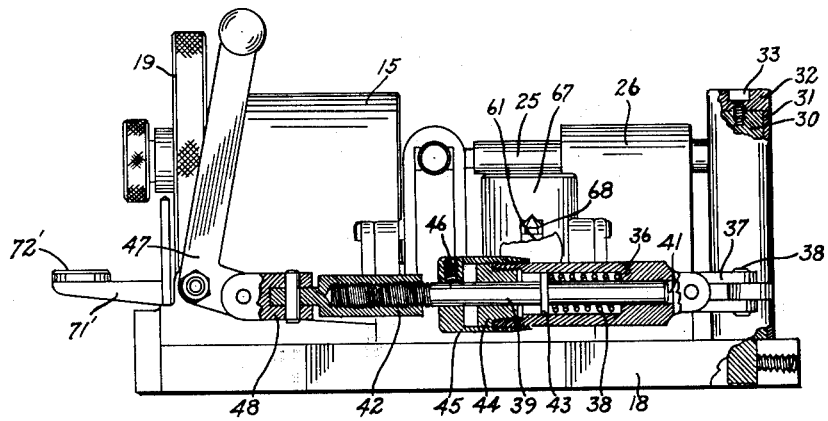
FIG. 4 is a side view, partially in section, of a preferred embodiment of the present invention.
Figure 5:
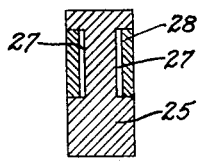
FIG. 5 is a sectional view taken on line 5—5 of FIG. 1.

The inner race 23 of bearing 11 is locked to the spindle end 12 by pressure plate 24 that is biased against the inner race 23. Pressure plate 24 is slip-fitted into shaft 25 that is slidably mounted through a bushing in housing 26. Shaft 25 is provided with a pair of flat portions 27, as shown in FIG. 5 of the drawings, and the yoke end 28 of a fulcrum arm 29 engages with shaft 25 at these flat portions. As best shown in FIGS. 1 and 4 of the drawings, fulcrum arm 29 is pivotally mounted on shaft 30 by means of the tubular portion 31. A cap 32 is attached to shaft 30 by means of screw 33 to retain fulcrum arm 29 in position. Lever end 34 of fulcrum arm 29 is attached to an adjustable spring mechanism 35 that applies the necessary force for pressure plate 24 to lock the inner race 23 of bearing 11 to spindle end 12.

Figure 3:
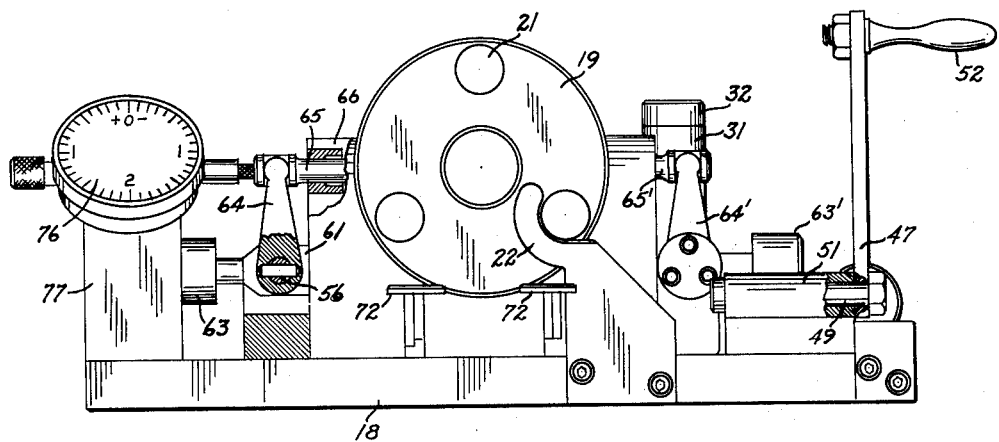
FIG. 3 is a front view, partially in section, of a preferred embodiment of the present invention.

Referring still to FIGS. 1 and 4 of the drawings, the spring mechanism that biases pressure plate 24 against the inner race 23 of bearing 11 is comprised of a spring housing 36 that is connected to lever end 34 through forked coupling 37. As forked coupling 37 is pivotally connected to lever end 34 by means of pin 38, linear movement of spring mechanism 35 will cause fulcrum arm 29 to be pivoted about shaft 30. Spring 38 is enclosed inside spring housing 36 and encompasses shaft 39 that has one end slidably mounted in bore 41 of spring housing 36. The other end of shaft 39 is threadedly attached to shaft housing 42. Shaft 39 is provided with a collar 43 that serves to compress spring 38 when shaft 39 is moved toward fulcrum arm 29, and bushing 44, which is threaded to spring housing 36, serves to support shaft 39 and also limit the backward travel of collar 43. An adjusting cap 45 is threadedly connected to spring housing 36 and also attached to shaft 39 by means of set screw 46, so that rotation of adjusting cap 45 causes shaft 39 to be rotated. As shaft 39 is threaded to shaft housing 42, rotation of shaft 39 will either increase or decrease the effective length of shaft 39 with a resulting increase or decrease of the amount of compression of spring 38. The outside periphery of spring housing 36 is provided with appropriate indicia to indicate pounds of spring pressure. Shaft housing 42 is connected to a L-shaped lever 47 through coupling 48. As best shown in FIG. 3 of the drawings, lever 47 is supported by shaft 49, which is journaled in housing 51. Housing 51 is attached to base plate 18. A handle 52 is attached to one end of lever 47 to facilitate the actuating of spring mechanism 35.

Figure 2:
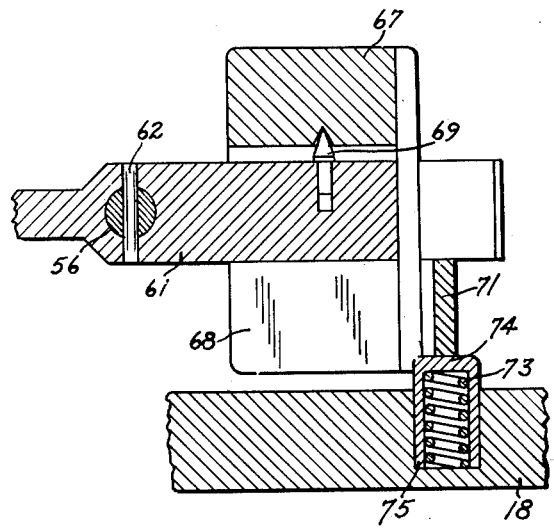
FIG. 2 is a sectional view taken on line 2—2 of FIG. 1.

Referring now to FIGS. 1, 2, and 3 of the drawings, a pair of weight assemblies 53 and 53 are shown that apply a force to the outer race 55 of bearing 11. Referring particularly to weight assembly 53, a shaft 56 is shown rotatably supported in bearings 57 and 58 that are housed in U-shaped bracket 59. A beam 61 is attached to shaft 56 by means of pin 62, and a counterbalance weight 63 is provided in order to statically balance beam 61 on the shaft 56. A yoke 64 is also pinned to shaft 56, and shaft 65, which is journaled in housing 66, is provided with a pair of flat portions that engage the radius ends of yoke 64. Weight 67, which is provided with a slot 68, is supported on the point of cone 69, that is fitted on beam 61, so that weight 67 will act upon shaft 56 through a precise, known lever arm.

The end of beam 61, upon which weight 67 is positioned, is supported by lever 71, which has one end rotatably attached to housing 26. The other end of lever 71 is provided with a finger key 72, and a spring 73, which is positioned between finger key 72 and the point on which beam 61 rests on lever 71, supports beam 61. As shown in FIG. 2 of the drawings, spring 73 is enclosed in a cap 74 that is retained in bore 75 in base plate 18. It can be seen that when finger key 72 is depressed, lever 71 is pivoted downwardly and, in turn, weight 67 moves downwardly causing shaft 56 to be rotated. Rotation of shaft 56 pivots yoke 64, which in turn forces shaft 65 against the outer race 55 of bearing 11 with a force whose magnitude depends upon the mass of weight 67. Any radial clearance between the inner and outer races of bearing 11 on the side the force is being applied is taken up, and the amount of travel of shaft 65 is shown by indicator 76, which is supported on base 18 by bracket 77.

In operation, the proper size spindle end 12 and pressure plate 24 are selected to fit the particular size bearing to be fitted. The bearing 11 is slip-fitted onto spindle end 12 while the pressure from spring mechanism 35 is removed. As viewed in FIG. 4 of the drawings, rotation of lever 47 in a counter-clockwise direction not only removes the spring pressure but, in addition, pivots fulcrum arm 29 so that shaft 25, and consequently, pressure plate 24, is moved back from spindle end 12 so that bearing 11 can be placed in position. Adjusting cap 45 is adjusted so that the proper pressure will be applied to the inner race 23 of bearing 11 when lever 47 is turned in a clockwise direction, as viewed in FIG. 4 of the drawings.

The proper size weights 67 and 67' are next selected and placed in position on beam 61 and 61', respectively. The plunger 78 of indicator 76 is next moved against the end of shaft 65. By depressing finger key 72, weight 67 acting on beam 61 causes shaft 56 to be rotated and consequently, yoke 64 pushes shaft 65 against the outer race 20 of bearing 11 with a force proportional to the mass of weight 67. This force moves the outer race 20, so that all the radial clearance is removed from the one side of the bearing, or in effect, shifts all the clearance to the other side. While finger key 72 is depressed, indicator 76 is zeroed and then finger key 72 is released. Upon releasing finger key 72, spring 73 raises lever 71, which in turn raises beam 61, and thus removes the force from the outer race 20 of bearing 11. Finger key 72' is then depressed, which then causes a force to be applied to the opposite side of outer race 20. The indicator 76 records any movement of the outer race, which movement is the radial clearance of the particular bearing being tested. The radial clearance of the bearing 11 being tested can be rapidly checked at three different positions by having an operator place a finger in the holes 21 and rotating wheel 19, which in turn rotates the inner race 23 of bearing 11.

It can thus be seen that the present invention provides an improved bearing tester capable of testing the radial clearance of various sizes of bearings. Furthermore, the weight to be applied to the outer race of a bearing to be tested can be rapidly changed without having to recalibrate the bearing tester.

Obviously many modifications and variations of the present invention are possible in the light of the above teachings. It is therefore to be understood, that within the scope of the appended claims, the invention may be practiced otherwise than as specifically described.

What is claimed is:

1. In a bearing tester, means for applying a load to the outer race of a bearing being tested, said means comprising: a first shaft rotatably mounted to a base plate, a beam secured to said first shaft in a plane transverse to the longitudinal axis of said first shaft, a second shaft slidably mounted to said base plate in a plane transverse to the longitudinal axis of said first shaft and having one end in engagement with the outer race of a bearing being tested and having a pair of flat notched portions on the other end, a yoke fixedly attached to said first shaft and having a forked end engaging said flat notched portions on said second shaft, and a weight removably attached to said beam for applying a load to the outer race of a bearing being tested.

2. In a bearing tester, means for applying a load to the outer race of a bearing being tested, said means comprising: a first shaft rotatably mounted to a base plate, a beam secured to said first shaft in a plane transverse to the longitudinal axis of said first shaft, a second shaft slidably mounted to said base plate in a plane transverse to the longitudinal axis of said first shaft and having one end in engagement with the outer race of a bearing being tested and having a pair of flat notched portions on the other end, a yoke fixedly attached to said first shaft and having a forked end engaging said flat notched portions on said second shaft, a weight removably attached to said beam for applying a load to the outer race of a bearing being tested, and resilient means supporting the end of said beam on which said weight is removably attached.

3. In a bearing tester, means for applying a load to the outer race of a bearing being tested, said means comprising: a first shaft rotatably mounted to a base plate, a beam secured to said first shaft in a plane transverse to the longitudinal axis of said first shaft, a second shaft slidably mounted to said base plate in a plane transverse to the longitudinal axis of said first shaft and having one end in engagement with the outer race of a bearing being tested and having a pair of flat notched portions on the other end, a yoke fixedly attached to said first shaft and having a forked end engaging said flat notched portions on said second shaft, a weight removably attached to said beam, resilient means supporting the end of said beam on which said weight is removably attached, and means for depressing said resilient means whereby said beam tilts to apply a load to the outer race of a bearing being tested.

4. A bearing tester for determining the amount of radial clearance in a bearing comprising: means for supporting a bearing having inner and outer races; means for locking said inner race to said supporting means; and means for applying a load to said outer race, said means comprising, a first shaft rotatably mounted to a base plate, a beam secured to said first shaft in a plane transverse to the longitudinal axis of said first shaft, a second shaft slidably mounted to said base plate in a plane transverse to the longitudinal axis of said first shaft and having one end in engagement with the outer race of a bearing being tested and having a pair of flat notched portions on the other end, a yoke fixedly attached to said first shaft and having a forked end engaging said flat notched portions on said second shaft, and a weight removably attached to said beam for applying a load to the outer race of a bearing being tested.

5. A bearing tester for determining the amount of radial clearance in a bearing as set forth in claim 4 wherein said means for locking said inner race to said supporting means comprises a slidably mounted shaft having a pressure plate on one end adaptable for engaging said inner race, a pivotally mounted fulcrum arm engaging said slidably mounted shaft, and a compression spring biasing said fulcrum arm.

6. A bearing tester for determining the amount of radial clearance in a bearing comprising: means for supporting a bearing having inner and outer races; means for locking said inner race to said supporting means; and means for applying a load to said outer race, said means comprising, a first shaft rotatably mounted to a base plate, a beam secured to said first shaft in a plane transverse to the longitudinal axis of said first shaft, a second shaft slidably mounted to said base plate in a plane transverse to the longitudinal axis of said first shaft and having one end in engagement with the outer race of a bearing being tested and having a pair of flat notched portions on the other end, a yoke fixedly attached to said first shaft and having a forked end engaging said flat notched portions on said second shaft, a weight removably attached to said beam, resilient means supporting the end of said beam on which said weight is removably attached, and means for depressing said resilient means whereby said beam tilts to apply a load to the outer race of a bearing being tested.

7. A bearing tester for determining the amount of radial clearance in a bearing as set forth in claim 6 wherein said means for supporting a bearing comprises: a housing, a tubular shaft rotatably supported in said housing, a spindle end supporting said inner race of said bearing, and means locking said spindle end to said tubular shaft.

8. A bearing tester for determining the amount of radial clearance in a bearing as set forth in claim 7 wherein an indexing wheel is attached to one end of said tubular shaft whereby said spindle end can be readily rotated to select positions.

9. A bearing tester for determining the amount of radial clearance in a bearing as set forth in claim 6 wherein said means for locking said inner race to said supporting means comprises: a slidably mounted shaft having a pressure plate on one end adaptable for engaging said inner race, a pivotally mounted fulcrum arm engaging said slidably mounted shaft, and a compression spring biasing said fulcrum arm.

10. A bearing tester for determining the amount of radial clearance in a bearing comprising: a base plate; a bearing support rotatably mounted on said base plate for supporting a bearing to be tested; means for locking the inner race of said bearing to said bearing support; first and second means for successively applying a load to the outer race of a bearing being tested, said first and second means each comprising: a first shaft rotatably mounted to said base plate, a beam secured to said first shaft in a plane transverse to the longitudinal axis of said first shaft, a second shaft slidably mounted to said base plate in a plane transverse to the longitudinal axis of said first shaft and having one end in engagement with the outer race of a bearing being tested and having a pair of flat notched portions on the other end, a yoke fixedly attached to said first shaft and having a forked end engaging said flat notched portions on said second shaft, and a weight removably attached to said beam for applying a load to the outer race of a bearing being tested.

11. A bearing tester for determining the amount of radial clearance in a bearing as set forth in claim 10 wherein said means for locking said inner race to said bearing support comprises: a slidably mounted shaft having a pressure plate on one end adaptable for engaging said inner race, a pivotally mounted fulcrum arm engaging said slidably mounted shaft, and a compression spring biasing said fulcrum arm.

12. A bearing tester for determining the amount of radial clearance in a bearing comprising: a base plate; a bearing support rotatably mounted on said base plate for supporting a bearing to be tested; means for locking the inner race of said bearing to said bearing support; first and second means for successively applying a load to the outer race of a bearing being tested, said first and second means each comprising: a first shaft rotatably mounted to said base plate, a beam secured to said first shaft in a plane transverse to the longitudinal axis of said first shaft, a second shaft slidably mounted to said base plate in a plane transverse to the longitudinal axis of said first shaft and having one end in engagement with the outer race of a bearing being tested and having a pair of flat notched portions on the other end, a yoke fixedly attached to said first shaft and having a forked end engaging said flat notched portions on said second shaft, a weight removably attached to said beam, resilient means supporting the end of said beam on which said weight is removably attached, and means for depressing said resilient means whereby said beam tilts to apply a load to the outer race of a bearing being tested.

13. A bearing tester for determining the amount of radial clearance in a bearing as set forth in claim 12 wherein said means for locking said inner race to said supporting means comprises: a slidably mounted shaft having a pressure plate on one end adaptable for engaging said inner race, a pivotally mounted fulcrum arm engaging said slidably mounted shaft, and a compression spring biasing said fulcrum arm.

References Cited in the file of this patent
UNITED STATES PATENTS

| | | |
|---|---|---|
| 2,623,392 | Howe | Dec. 30, 1952 |
| 2,833,047 | Aller et al. | May 6, 1958 |